(12) United States Patent
Rapson

(10) Patent No.: US 9,474,139 B2
(45) Date of Patent: Oct. 18, 2016

(54) CONTROL OF IGNITION FOR A CERAMIC HIGH INTENSITY DISCHARGE LAMP

(71) Applicant: GREENTEK GREEN SOLUTIONS (2009) LTD., Netanya (IL)

(72) Inventor: Dov Rapson, Avihail (IL)

(73) Assignee: GREENTEK GREEN SOLUTIONS (2009) LTD., Netanya (IL)

( * ) Notice: Subject to any disclaimer, the term of this patent is extended or adjusted under 35 U.S.C. 154(b) by 0 days.

(21) Appl. No.: 14/908,140

(22) PCT Filed: Jul. 30, 2014

(86) PCT No.: PCT/IB2014/063555
§ 371 (c)(1),
(2) Date: Jan. 28, 2016

(87) PCT Pub. No.: WO2015/015442
PCT Pub. Date: Feb. 5, 2015

(65) Prior Publication Data
US 2016/0205754 A1    Jul. 14, 2016

(30) Foreign Application Priority Data

Aug. 1, 2013 (GB) .................................. 1313770.8

(51) Int. Cl.
*H05B 41/04* (2006.01)
*H05B 41/288* (2006.01)

(52) U.S. Cl.
CPC ................................. *H05B 41/2883* (2013.01)

(58) Field of Classification Search
CPC ........................ H05B 41/2883; H05B 41/2928
USPC ........................................................ 315/112
See application file for complete search history.

(56) References Cited

U.S. PATENT DOCUMENTS

| 6,369,526 | B1 | 4/2002 | Pogadaev et al. |
| 2007/0103088 | A1* | 5/2007 | Tsai ..................... H05B 41/386 315/194 |
| 2010/0001656 | A1* | 1/2010 | Li ........................ H05B 41/042 315/289 |
| 2010/0141164 | A1* | 6/2010 | Patchornik ......... H05B 41/2883 315/224 |

(Continued)

FOREIGN PATENT DOCUMENTS

| EP | 2448375 A2 | 5/2012 |
| GB | 2477463 A | 8/2011 |
| WO | WO2008/135089 | * 11/2008 ........... H05B 41/288 |

OTHER PUBLICATIONS

United Kingdom Intellectual Property Office, Combined Search and Examination Report Under Sections 17 & 18(3), Jan. 8, 2014, App No. GB1313770.8.

(Continued)

*Primary Examiner* — Don Le
(74) *Attorney, Agent, or Firm* — Dr. Hanan Farber Patent Agent Ltd.

(57) ABSTRACT

High frequency ballasts are provided herein for ignition control of a ceramic high intensity discharge (HID) lamp. A sensor senses a lamp parameter on the output terminals. A microprocessor is attached to the ignition circuit and the sensor. The ignition circuit is configured by the microprocessor to apply a train of pre-ignition bursts to the electrodes and stop the train of pre-ignition bursts responsive to measurement of the lamp parameter. The measured lamp parameter is indicative of a stable arc at the proximal ends of the capillaries.

20 Claims, 5 Drawing Sheets

(56) References Cited

U.S. PATENT DOCUMENTS

2010/0270936 A1* 10/2010 Dijkstra ............. H05B 41/3921
 315/219
2011/0043119 A1* 2/2011 Kostrun ............. H05B 41/2881
 315/209 T

OTHER PUBLICATIONS

Patent Cooperation Treaty, Written Opinion of the International Searching Authority, Jan. 4, 2015, PCT/IB2014/063555.
Patent Cooperation Treaty, PCT, International Search Report, PCT/IB2014/063555, Jan. 4, 2015.
Israel Patent Office, Search Strategy, PCT/IB2014/063555.

* cited by examiner

CONTROL OF IGNITION FOR A CERAMIC HIGH INTENSITY DISCHARGE LAMP

BACKGROUND

1. Technical Field

The present invention relates to a ballast circuit used to ignite a ceramic high intensity discharge (HID) lamp and, more particularly for an improved ignition control of a ceramic high intensity discharge lamp.

2. Description of Related Art

A high-intensity discharge (HID) lamp produces light by means of an electric arc between electrodes housed inside an arc tube of a transparent material such as fused quartz or alumina. The tube is filled with both gas and a dose of metal salts. The gas facilitates an initial strike or ignition of an arc. Once the arc is started, the arc heats and evaporates the metal salts. A plasma is formed which greatly increases the intensity of light produced by the arc and reduces power consumption. In typically 1 to 2 minutes, a low powered 70 W HID lamp warms up to produce its rated light output. When the HID lamp is initially cool, an ignition voltage of 4000 volts for instance is typically required to ignite the HID lamp. After ignition, the HID ballast provides alternating current to the lamp at low voltage, e.g. 20-200 Volts. The physical properties of an HID lamp typically determine the operating voltage across the HID lamp.

Reference is now made to FIG. 2 which shows a plan cross-sectional view of ceramic HID lamp 14, according to conventional art. Ceramic HID lamp 14 includes electrodes 20 extending at the proximal ends of electrodes 20 into an arc chamber 28 which is interior to an arc tube 26. Electrodes 20 connect electrically at the distal ends to the output of the ballast circuit supplying the lamp 14. Electrodes 20 pass through respective bores 24 of capillaries 25 and are sealed inside a portion of bore 24 by seal 22 near the distal ends of capillaries 25.

Lamp 24 of construction as shown in FIG. 2 is known as a "ceramic" HID lamp in distinction with a "quartz" HID lamp with arc tube of material fused silica or polycrystalline quartz. In quartz HID lamps, the seal to the electrode is formed by pinching the tube material while in a viscous semi-liquid state onto the electrode near the entrance to the arc chamber. In ceramic HID lamps of ceramic materials other than fused silica or quartz, the pinch seal is not available and seal 22 is formed by melting glass or ceramic frit inside distal portions of bore 24 within capillaries 25. U.S. Pat. Nos. 7,701,142, 7,728,495 and US patent application publication US20020145388 are representative references describing ceramic arc lamps.

Ceramic HID lamps 14 may provide improvements over the quartz metal halide (MH) lamps, both in the light efficacy, color temperature and color rendering index (CRI). Normally the color temperature of MH quartz lamps is over 4000 kelvin with CRI of 65 to 70. Ceramic lamps 14 typically may provide warmer light typically around 3200K with CRI of 90. Light efficacy may be over 110 lumen per Watt (L/W), while from quartz MH lamps the efficacy is typically around 90 L/W.

Most HID lamps, including ceramic HID lamps 14 are operated at low frequency of less than 400 Hz. However, operating at high frequency range, over 100 kHz may provide advantages such as longer life, lower lumen depreciation, stable color and CRI. For instance, lumen depreciation of a quartz metal halide (MH) lamp at low frequency operation after 8000 hours may go down as low as 50% of the initial value, while operating the same lamp at high frequency may show lumen depreciation of only less than 15% at 8000 hours of operation. Ignition with high frequency may improve even further HID lamp performance over life time comparing to the conventional low frequency ignition methods.

Reference is now made to FIG. 3 which shows two measurement traces 30 for vertical axes voltage (V) and current (I) versus common horizontal time axis for a standard high frequency ignition process normally used for a quartz HID lamp and applied to ceramic HID lamp 14. The initial voltage applied at a time indicated by line 32a is approximately 4000 volts peak-to-peak followed by 2500 volts peak to peak. The time interval between dotted lines 32a and 32b shows a glow-to-arc transition during a time interval of almost 600 milliseconds. In most cases, during the glow-to-arc transition an arc in bore 24 may be observed in bore 24 as bore 24 is being lit up by the glow.

The arc created in bore 24 while lighting up bore 24 was found to be a destructive phenomenon. During the ignition of a cold ceramic HID lamp 14, at high frequency, the metal halides that were condensed in bore 24 provide a low impedance for the arc to build up in the capillaries 25. Only after vaporization of the metal halides and warm up of electrodes 20, the arc move to the proximal ends of electrodes 20 creating stable arc transition from glow. During the glow in the capillaries 25 in bore 24, the energy provided is very high, since the voltage is high (over 300V), although the current is limited to the normal warm up current set-up. This high power can damage or even melt the sealed material in bore 24, and overheat the ceramic tube bore walls of capillaries 25, which may eventually result in catastrophic early failure of ceramic HID lamp 14.

UK patent GB2477463 of the present Applicant discloses application to the electrodes of multiple pre-ignition voltage bursts adapted to avoid arcing in bores 24 of the capillaries surrounding electrodes 20 prior to ignition. The pre-ignition bursts momentarily ignite the ceramic HID lamp and cause significant current to momentarily flow. During the pre-ignition bursts an arc is formed but substantially only between the proximal ends of the electrodes and not in the bore. The ignition circuit is configured by the microprocessor to apply to the electrodes between three and ten pre-ignition bursts, each pre-ignition burst followed by a time delay 0.5-1.5 seconds of substantially zero voltage. The pre-ignition voltage bursts have a previously determined time period set between five to two hundred milliseconds, a peak voltage of 2000-4000 volts and a frequency of 100-500 kilohertz. The pre-ignition voltage bursts heat electrodes 20 prior to normal operation to avoid arcing in the bores of the capillaries surrounding electrodes 20.

Although application of the pre-ignition bursts according to the teachings of GB2477463 were found to successfully ignite ceramic discharge lamps while avoiding arcing in the bores of the capillaries surround the electrodes, the Applicant had limited success in previously determining the duration of the bursts and the time to stop applying the bursts to avoid arcing in bores 24 in a wide range of lamp types and over multiple production runs of the same lamp type.

Thus there is a need for and it would be advantageous to have a control system and method for application of pre-ignition bursts prior to subsequent operation of ceramic HID lamps 14 which determines the burst width and duration of the train of the pre-ignition bursts for different lamps.

BRIEF SUMMARY

Various methods are provided for herein for ignition of a ceramic high intensity discharge (HID) lamp. The ceramic HID lamp includes an arc chamber and two capillaries each connected to the arc chamber at respective proximal ends and two electrodes each sealed within the capillaries by respective seals near the distal ends of the capillaries. The electrodes extend from the seals through respective bores in the capillaries and protrude into the arc chamber at the proximal ends of the capillaries. A train of pre-ignition voltage bursts is applied to the electrodes while increasing the duration of the pre-ignition voltage bursts. A lamp parameter is measured during a time interval between the pre-ignition voltage bursts. Responsive to the measured lamp parameter, application of the pre-ignition voltage bursts is stopped. The measured lamp parameter is indicative of a stable arc between the proximal ends of the capillaries. The measured lamp parameter may be a voltage across the output terminals, a current through the output terminals, a frequency at the output terminals, a phase difference at the output terminals, a power at the output terminals, an impedance at the output terminals and a temperature at the output terminals. Time duration of the pre-ignition bursts and/or time duration of the train may be adaptively increased responsive to the measured lamp parameter. Burst rate of the pre-ignition bursts may be adaptively increased responsive to the measured lamp parameter. The measured lamp parameter may indicate a lamp current which is substantially symmetric between positive and negative current flow and/or indicate an absolute value average lamp current less than a previously determined value. The measured lamp parameter may indicate that the electrodes are fully warmed up and any metallic halides previously deposited on the electrodes are substantially evaporated from the electrodes. The electrodes are heated by the pre-ignition bursts prior to normal operation thereby avoiding arcing in the bores of the capillaries surrounding the electrodes. Subsequent to stopping the pre-ignition voltage bursts, there is time delay between a half and three seconds. After the time delay, a final ignition burst ignites the HID lamp. The pre-ignition momentarily ignite the ceramic HID lamp and cause significant current to momentarily flow. During the pre-ignition bursts an arc is formed substantially only between the proximal ends of the electrodes. The pre-ignition voltage bursts have a peak voltage of 2000-4000 volts. The pre-ignition voltage bursts have a frequency of 100-500 kilohertz. The pre-ignition voltage bursts are configured to have sufficiently short duration to avoid arcing in the bores of the capillaries surrounding the electrodes.

Various high frequency ballasts are provided herein for ignition control of a ceramic high intensity discharge (HID) lamp. The ceramic HID lamp includes an arc chamber and two capillaries each connected to the arc chamber at respective proximal ends of the capillaries, two electrodes each sealed within the capillaries by respective seals near the distal ends of the capillaries. The electrodes extend from the seals through respective bores in the capillaries and protrude into the arc chamber at the proximal ends of the capillaries. The high frequency ballast further includes an ignition circuit connected to output terminals. The electrodes connect to the output terminals. A sensor senses a lamp parameter on the output terminals. A microprocessor is attached to the ignition circuit and the sensor. The ignition circuit is configured by the microprocessor to apply a train of pre-ignition bursts to the electrodes and stop the train of pre-ignition bursts responsive to measurement of the lamp parameter. The measured lamp parameter is indicative of a stable arc at the proximal ends of the capillaries. The lamp parameter may be measured during a time interval between the pre-ignition voltage bursts. The lamp parameter may include a voltage across the output terminals, a current through the output terminals, a frequency at the output terminals, a phase difference at the output terminals, a power at the output terminals, an impedance at the output terminals and/or a temperature at the output terminals. A time duration of the pre-ignition bursts may be adaptively increased responsive to the measured parameter. A burst rate of the pre-ignition bursts may be adaptively increased responsive to the measured parameter. The pre-ignition voltage bursts may have a peak voltage of 2000-4000 volts. The pre-ignition voltage bursts may have a frequency of 100-500 kilohertz. The ignition circuit may be configured by the microprocessor during the pre-ignition bursts to momentarily ignite the ceramic HID lamp and cause thereby significant current to momentarily flow. During the pre-ignition bursts an arc may be produced substantially only between the proximal ends of the electrodes. The ignition circuit is configured by the microprocessor to apply a final ignition burst and to operate the lamp, only after the electrodes are sufficiently heated by the pre-ignition bursts to avoid arcing in the bores of the capillaries during the final ignition burst.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

DETAILED DESCRIPTION

Figure 1:
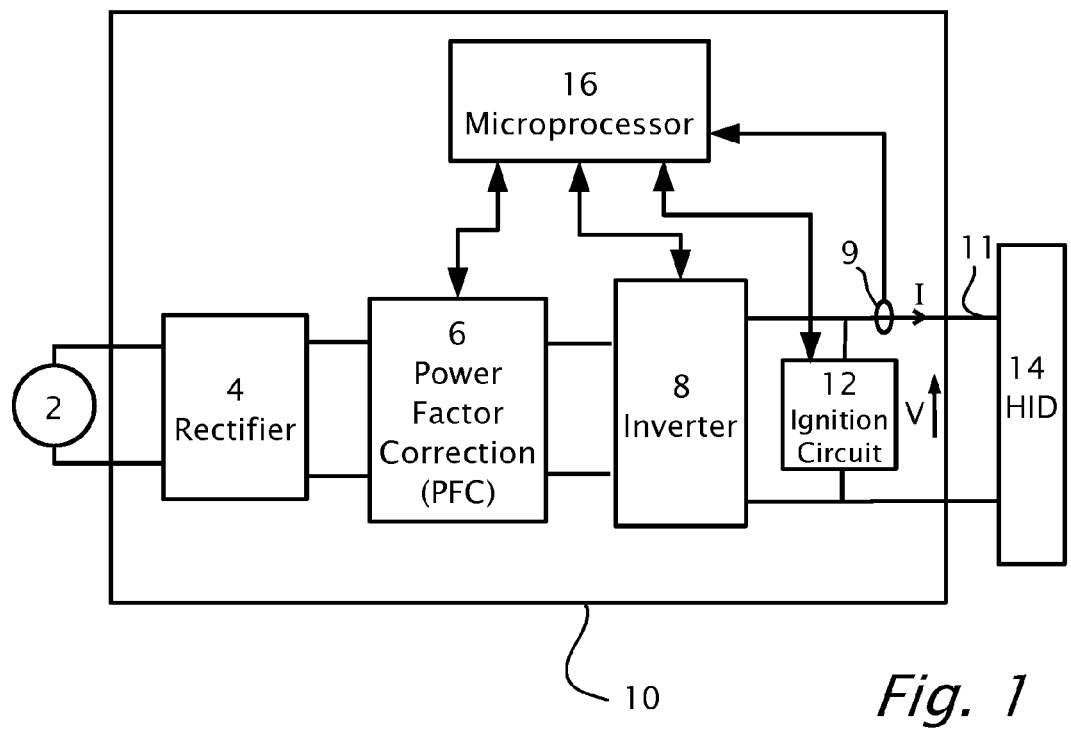
FIG. 1 shows a high frequency ballast circuit for operating a ceramic high-intensity discharge (HID) lamp, according to features of the present invention.
Figure 2:
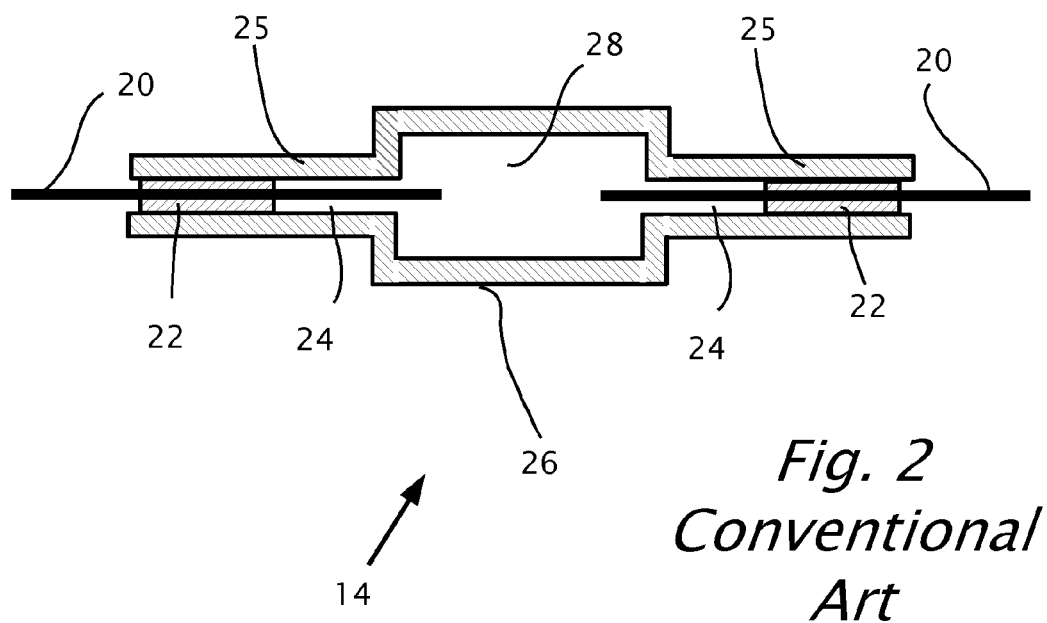
FIG. 2 shows a plan cross-sectional view of a ceramic HID lamp, according to conventional art.
Figure 3:
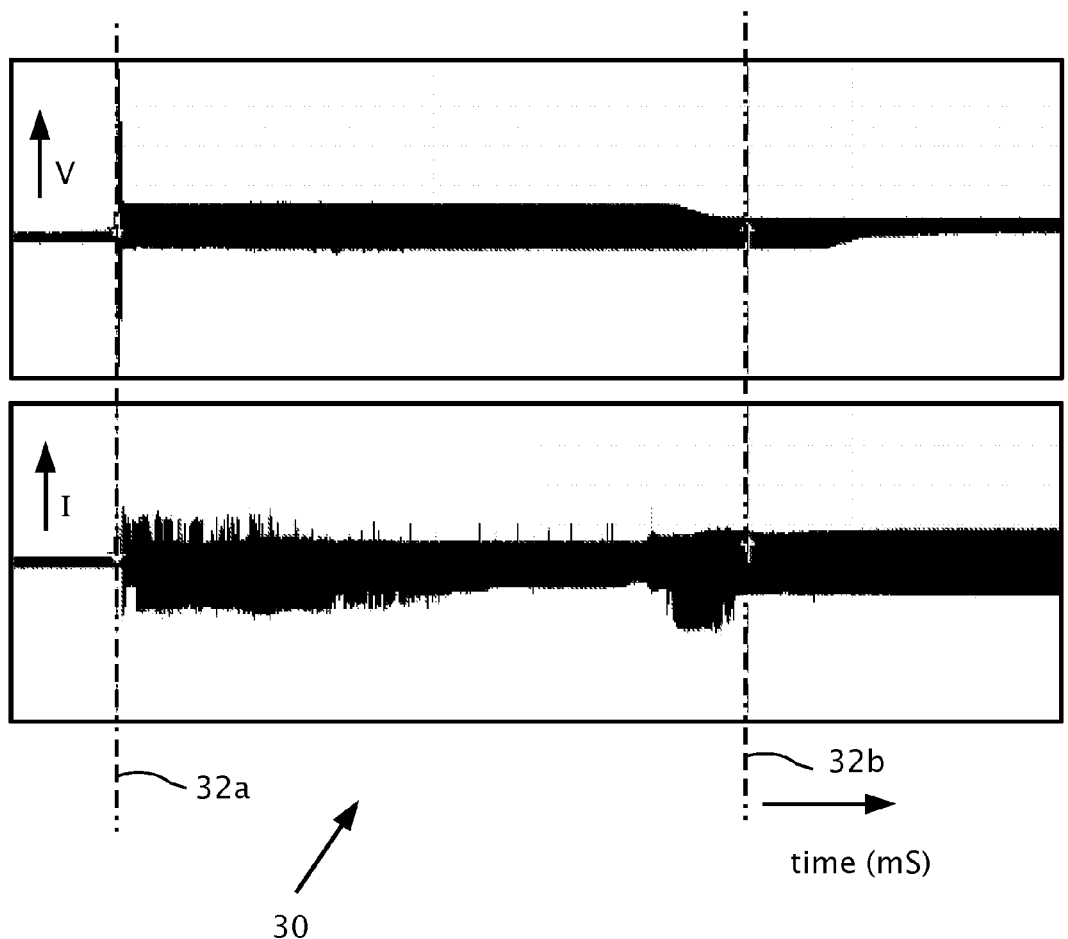
FIG. 3 shows two measurement traces for vertical axes voltage (V) and current (I) versus common horizontal time axis for a standard high frequency ignition process applied to a ceramic HID lamp.

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, it has been found that conventional high frequency ignition as applied to quartz HID lamps cause ceramic HID lamps 14 to have a short lifetime because of plasma and/or arc formation in bore 24 around electrode 20. Using a conventional ignition method as applied to quartz HID lamps, arc formation typically does not occur for several seconds after the ignition burst starts during which time the lamp is warming. During the warming period, e.g. 5-10 seconds, plasma formation, glow and/or arcing may occur in bore 24 around electrode 20, prior to arc formation between tips of electrodes 20. The plasma and/or arcing in bore 24 prior to ignition causes any number of effects which are deleterious to the long term reliability of lamp 14. These effects may include heating of capillaries 25 and seal 22 which may cause thermal temperature gradients and cracking and/or differential thermal expansion; corrosion from active metallic ions in the plasma formed and sputtering of electrode 20 and/or seal 22.

Control systems and methods are disclosed herein provide control of the burst width and duration of the burst train of pre-ignition bursts so that ignition is achieved in minimal time while avoiding arcing in capillaries 25. Embodiments of the present invention are directed to systems and methods of controlling pre-ignition of ceramic HID lamp 14 to extend the working lifetime of ceramic high-intensity discharge (HID) lamps.

Referring now to the drawings, FIG. 1 shows a ballast circuit 10, according an embodiment of the present invention. Ballast circuit 10 has an input connected to an alternating current (mains AC) power supply 2 and output terminals 11 connected to high-intensity discharge (HID) lamp 14. High intensity discharge (HID) lamp 14 connects to output terminals 11. A rectifier 4 has an input from mains electricity, typically a 120/240 root mean square (RMS) alternating current (AC) voltage with a frequency of 60/50 Hertz. Rectifier 4 rectifies mains electricity to produce a direct current (DC) output which is input into power factor correction (PFC) circuit 6. The DC output of PFC 6 is connected to the input of inverter circuit 8; inverter 8 may be a "half bridge" or a "full bridge" inverter circuit for produces a controlled alternating current output for normal operation of HID lamp 14. Ignition circuit 12 is connected in parallel to output terminals 11. Microprocessor 16 is operatively attached to PFC 6, inverter 8 and ignition circuit 12 via control lines. Optionally, microprocessor 16 performs monitoring of ignition circuit 12 and inverter circuit 8. Microprocessor 16 is programmed to control ballast circuit 10 according to features of the present invention as detailed in the following figures. A current sensor 9 is attached to microprocessor to provide a measurement of current through output terminals 11. Sensor 9 and/or other sensors (not shown) may connect to microprocessor 16 to provide a measurement of voltage across output terminals frequency, phase, power at output terminals 11 and/or temperature at output terminals 11.

Figure 4:
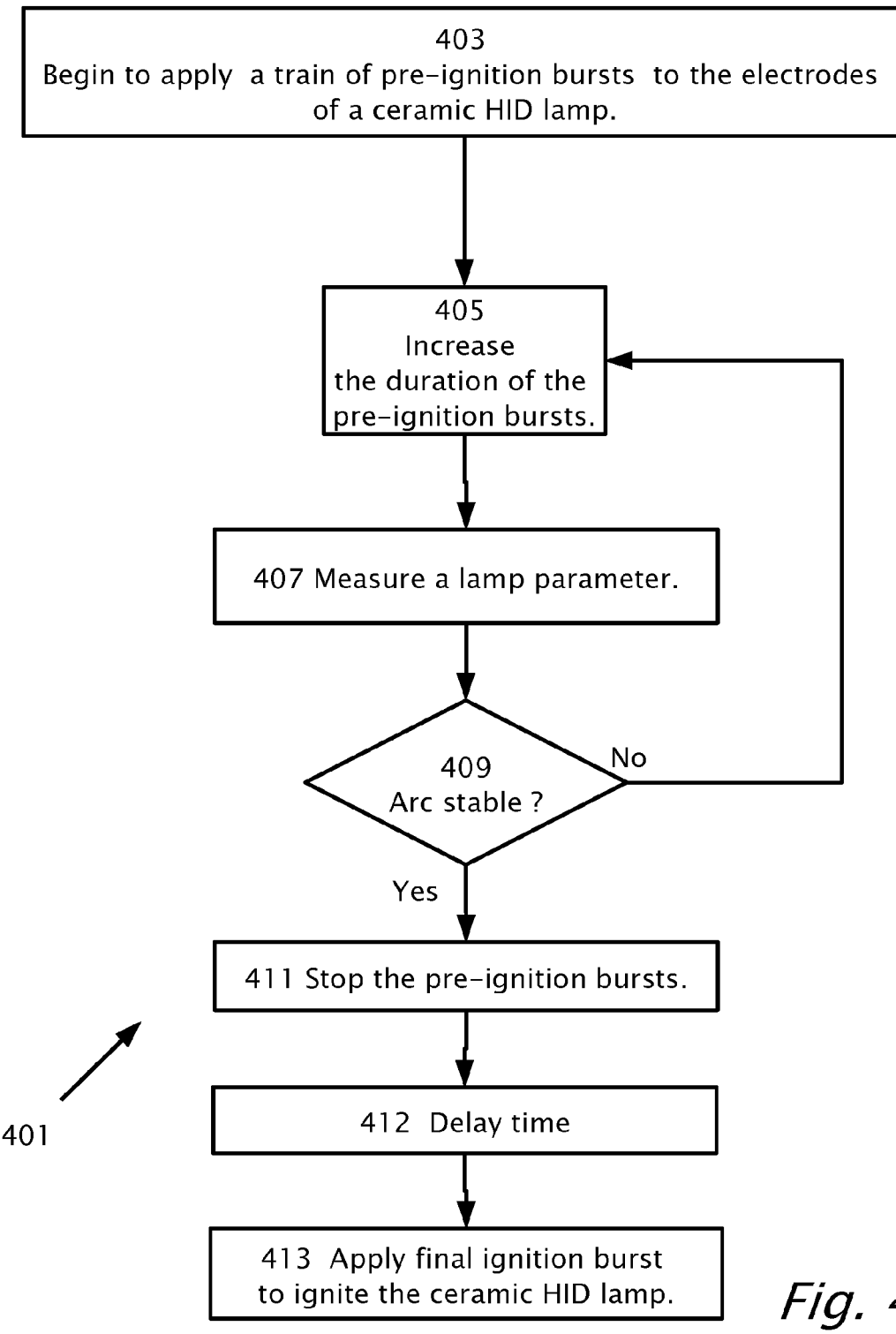
FIG. 4 illustrates a flowchart of a method for control of ignition of a ceramic HID lamp according to a feature of the present invention.

Reference is now made to FIG. 4 which illustrates a flowchart of a method 401 for pre-ignition control, according to a feature of the present invention. In step 403, a train of pre-ignition bursts is applied to electrodes 20 of ceramic HID lamp 14. Within the train of pre-ignition bursts the time duration of the pre-ignition bursts is increased (step 405). A lamp parameter is measured (step 407). If the measured lamp parameter is indicative of a stable arc (decision block 409) between the proximal ends of electrodes 20 then the pre-ignition bursts are stopped (step 411). In step 412, after a time delay $t_1$ of 0.5 to 3 seconds, intended to allow electrodes 20 to fully heat up and/or to complete evaporation of the metal halides inside bores 24, a final ignition burst is applied (step 413) to ignite ceramic HID lamp 14. Otherwise, in decision block 409 if the measured lamp parameter is not indicative of a stable arc between the proximal ends of electrodes 20, then the duration of the pre-ignition bursts may be further increased (step 405) and the lamp parameter is measured again (step 407).

Figure 5:
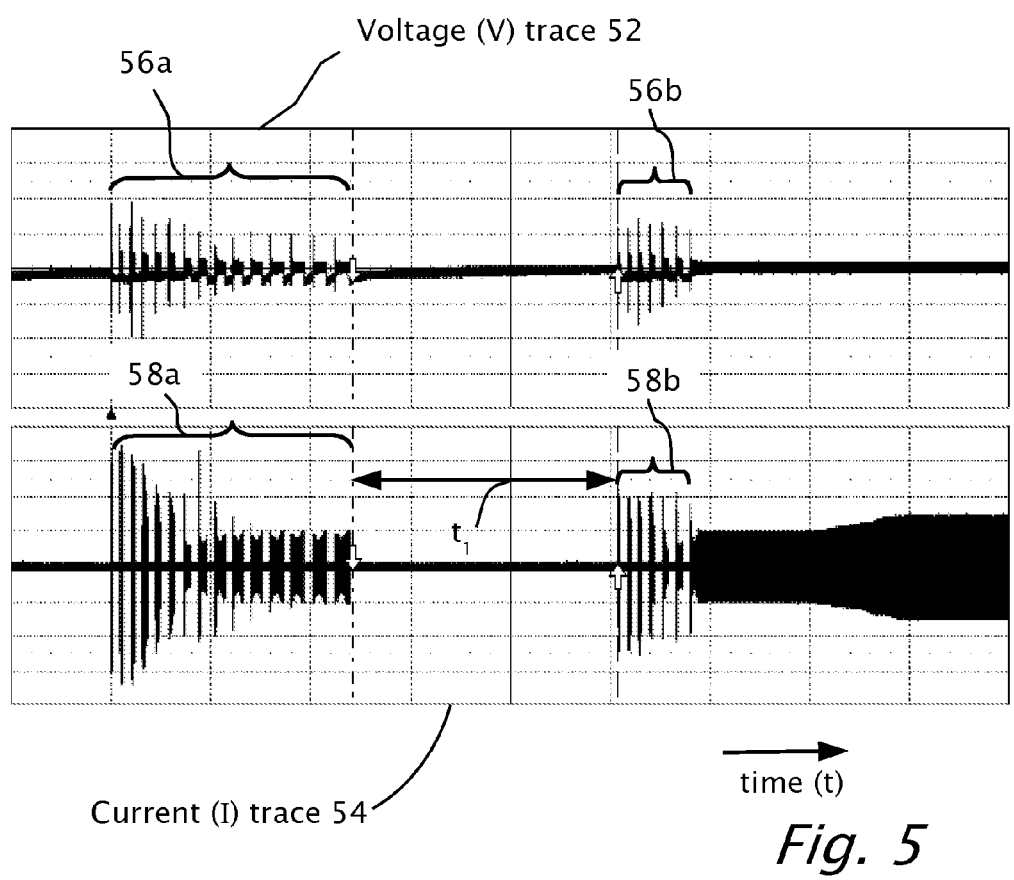
FIGS. 5, 6a and 6b include examples of current and voltage measurement traces, according to a feature of the present invention.

Reference is now also made to FIG. 5 which illustrates two measurement traces, voltage trace 52 and current trace 54 respectively which show over the same time scale the results of pre-ignition control and subsequent normal operation of ballast circuit 10 connected to ceramic HID lamp 14 using method 401, according to a feature of the present invention. In the example of FIG. 5, ceramic HID lamp 14 used is a Cera Arc™ CMP360/BUD/840/ceramic metal halide HID lamp (EYE Lighting International of North America, INC, 9150 Hendricks Rd., Mentor, Ohio 44060). Multiple trains of pre-ignition bursts (~200 KHz) as measured on output terminals 11 are shown as voltage traces 56a and 56b and current traces 58a and 58b. It can be seen that the time duration of the applied pre-ignition bursts is increased with time in burst train 56a. The current bursts of pre-ignition bursts as shown in burst train 58a are shown as stable from burst to burst and symmetric around zero current. When a stable arc as indicated by symmetric current bursts at the end of burst train 58a, the burst train is stopped. After the first sequential train of multiple pre-ignition bursts shown by burst train voltage trace 56a and current trace 58a there is a time interval $t_1$ before the next sequence of sequential train of pre-ignition bursts shown by voltage trace 56b and current trace 58b. A delay time $t_1$, of 0.5 to 3 seconds for instance allows for complete evaporation of the metal halides inside bores 24. On the next ignition train sequence 56b, 58b the arc is created only between the proximal ends of electrodes 20.

Figure 6A:
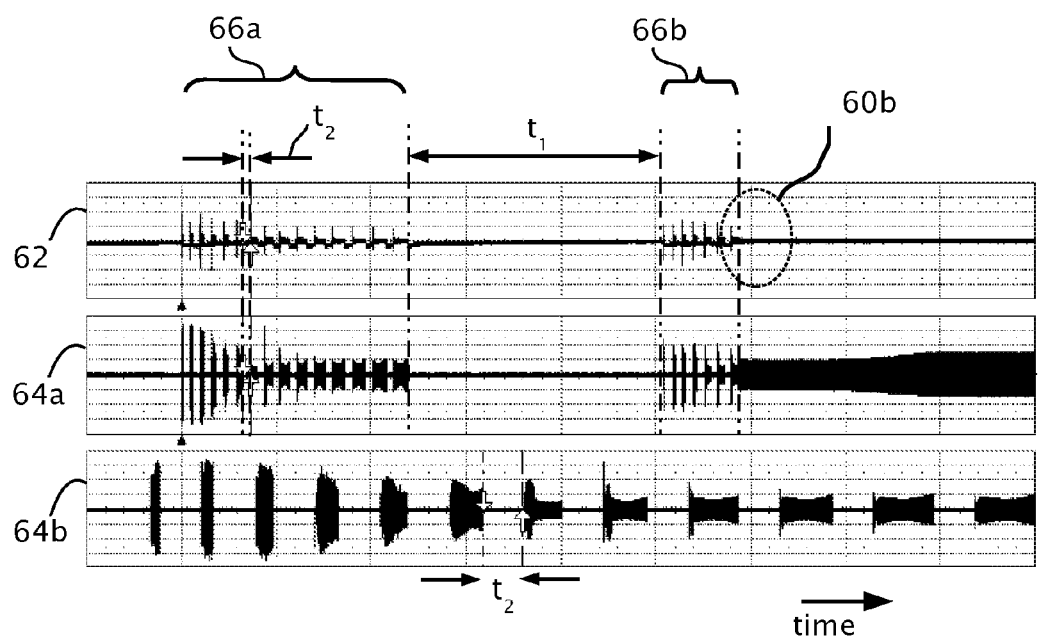

Reference is now also made to FIG. 6a which shows another example of three measurement traces 62, 64a and 64b, according to a feature of the present invention. In the example of FIG. 6, ceramic HID lamp 14 is a MASTER-Colour™ CDM-TMW Elite 315W/930 CL P 1CT (Royal Philips Electronics Amstelplein 2, Breitner Center, P.O. Box 77900, 1070 MX Amsterdam, The Netherlands). Multiple trains of pre-ignition bursts as measured on output terminals 11 are shown on voltage trace 62 and current trace 64a. Voltage trace 62 and current trace 64a show the first train 66a of multiple pre-ignition bursts. There is a rest time of about 2.6 seconds shown as time $t_1$ before the next train 66b of pre-ignition bursts.

Further detail of current trace 64a is shown in greater detail in current trace 64b. Time period $t_2$ is shown in both current trace 64a and expanded current trace 64b. At the beginning of current trace 64b, the time duration of the applied pre-ignition bursts are approximately 40 millisecond with peak to peak amplitude of 30 amps. Later in burst train 66a, the time duration of the pre-ignition bursts is approximately 120 millisecond with peak to peak amplitude of 10 amps. It can be seen that the current bursts near the end of burst train 64a are stable and symmetric about zero current. This may indicate a stable arc at the proximal ends of capillaries 25.

Figure 6B:
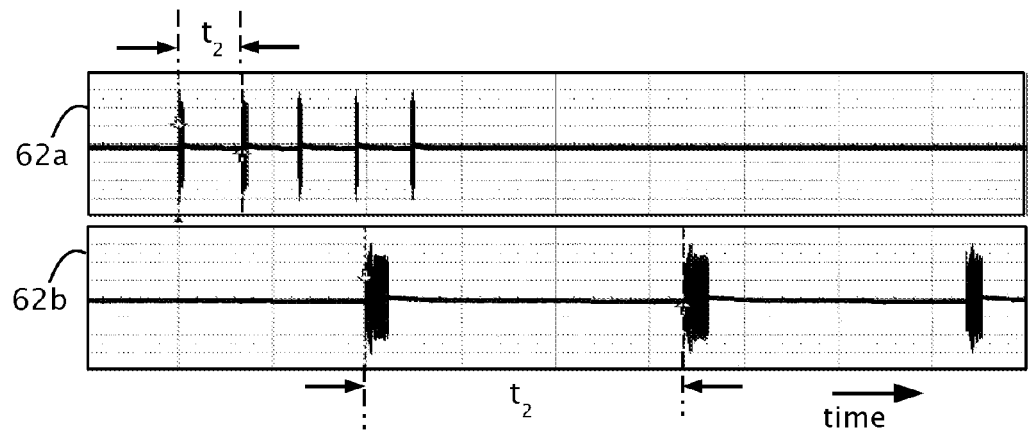

Reference is now also made to FIG. 6b which shows two voltage measurement traces 62a and 62b, according to a feature of the present invention. Voltage measurement trace 62a is a further detail of voltage burst train 66b shown in FIG. 6a. Further details of voltage measurement trace 62a is shown in voltage trace 62b.

Control Using Sensed Voltage on Sensor 9

It was found that the response voltage ~100 Volts (less than normal operating voltage) on output terminals 11 measured during time interval $t_1$ may correlate well with symmetric current bursts and the existence of a stable arc between the proximal ends of electrodes 20. The response voltage indicative of a stable arc may vary from lamp to lamp and from production run to production run. One or more sample lamps may be tested to find the response voltage at which the arc becomes stable. In operation, the response voltage is then used as the indication of a stable arc (decision block 409) between the proximal ends of electrodes 20 without arcing in bores 24. When the response voltage measured between electrodes 20 approaches the previously determined response voltage than the pre-ignition burst sequence may be stopped (step 411).

Control Using Sensed Current on Sensor 9

Current bursts may be monitored (step 407) and analyzed using an analog-to-digital A/D converter input to microprocessor 16. Microprocessor 16 may be programmed to stop application (step 411) of the pre-ignition bursts when at least two sequential bursts are symmetric, about zero current, that is average current is less than a predetermined threshold value. Other criteria may be used for instance one or more similar bursts symmetric over time may also indicate a stable arc between the proximal ends of the electrodes 20 has been achieved.

Control Using a Temperature Sensor

A temperature measurement (step 407) from a temperature sensor attached to one or more electrode 20 may be used as an indication that the pre-ignition bursts may be stopped (step 411)

Control Using a Dynamic Model of Lamp 14

A dynamic model of ceramic HID lamp 14 can be identified and built from input/output ceramic HID lamp 14 measurements obtained under an experimental protocol in open or in closed loop. During the experimental protocol, the effects of applied voltages and/or currents on terminals 11 may be monitored and stored as a response data. During the experimental protocol, the effects of different frequencies, phases, current amplitudes and voltage amplitudes for the applied voltages and/or currents on terminals 11 and the resulting temperature changes in HID lamp 14 are used to build the dynamic model of ceramic HID lamp 14. The response data as a result of applying voltages and/or currents on terminals 11 may be measured and collected on terminals 11 via sensor 9. The response data may include parameters such as temperature, current and/or voltage with the passage of time for various different types of ceramic HID lamps 14 and respective dynamic models. The design and tuning of the controller/microprocessor 16 may be done from the response data measured and collected on terminals 11 via sensor 9 and may be stored in local memory as look up tables for different ceramic HID types. The parameters of the dynamic model for a certain ceramic HID lamp 14 may be expressed in terms of how the impedance on terminals 11 varies dynamically during the application of the experimental protocol. The dynamic model may be used to achieve optimal ignition during the full lifetime of ceramic HID lamp 14.

The term "bore" 24 as used herein refers to the hollow portion interior to capillary 25 and proximal to seal 22. The term "proximal" as used herein refers to the ends of electrodes 20 and/or capillaries 25 which protrude into arc chamber 28. The term "distal" as used herein refers to outer ends of electrodes 20 and/or capillaries 25 more distant from the center of arc chamber 28.

The term "peak voltage" as used herein refers to absolute value peak voltage.

The term "high frequency" as used herein in the context of high frequency normal operation of a HID lamp refers to an operation around or greater than 100 kiloHertz.

The term "low frequency" as used herein in the context of low frequency normal operation of a HID lamp refers to an operation at a frequency of order of magnitude or, less than 400 Hertz.

The term "adaptive" as used herein refers to an adaptive control method in which control parameters may vary, or are initially uncertain.

The term "stable" as used herein in the context of a stable arc refers to a stable measurement of current and/or voltage responsive to pre-ignition bursts applied to the ceramic HID lamp.

The term "burst" as used herein refers to a high frequency and high voltage ignition pulses of several alternating cycles. The burst may be resonant or non-resonant.

The term "train" as used herein refers to a series of bursts.

The definite articles "a", "an" is used herein, such as "an ignition burst", "a frequency", a "train" have the meaning of "one or more" that is "one or more ignition bursts", "one or more frequencies" or "one or more trains".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

What is claimed is:

1. A method for ignition of a ceramic high intensity discharge (HID) lamp, wherein the ceramic HID lamp includes an arc chamber and two capillaries each connected to the arc chamber at respective proximal ends, two electrodes each sealed within the capillaries by respective seals near the distal ends of the capillaries, wherein the two electrodes extend from the seals through respective bores in the capillaries and protrude into the arc chamber at the proximal ends of the capillaries, the method including the steps of:

applying a train of pre-ignition voltage bursts to the two electrodes while increasing the duration of the pre-ignition voltage bursts;

measuring a lamp parameter during a time interval between the pre-ignition voltage bursts; and responsive to the measured lamp parameter, stopping the pre-ignition voltage bursts, wherein the measured lamp parameter is indicative of a stable arc between the proximal ends of the capillaries.

2. The method of claim 1, wherein the lamp parameter is selected from the group consisting: a voltage across said two electrodes, a current through said two electrodes, a frequency at said two electrodes, a phase difference at said two electrodes, a power at said two electrodes, an impedance at said two electrodes and a temperature at said two electrodes.

3. The method of claim 1, further comprising the step:

adaptively increasing time duration of the pre-ignition bursts responsive to the measured lamp parameter.

4. The method of claim 1, further comprising the step:

adaptively increasing burst rate of the pre-ignition bursts responsive to the measured lamp parameter.

5. The method of claim 1, wherein the measured lamp parameter indicates a lamp current which is substantially symmetric between positive and negative current flow.

6. The method of claim 1, wherein the measured lamp parameter indicates an absolute value average lamp current less than a previously determined value.

7. The method of claim 1, wherein the measured lamp parameter indicates that said two electrodes are fully warmed up and any metallic halides previously deposited on said two electrodes are substantially evaporated from said two electrodes.

8. The method of claim 1, further comprising:
heating said two electrodes prior to normal operation, thereby avoiding arcing in the bores of the capillaries surrounding said two electrodes, wherein said heating is performed by the pre-ignition bursts.

9. The method of claim 1, further comprising the step of:
subsequent to said stopping said pre-ignition voltage bursts, delaying a time period between half and three seconds; and
applying a final ignition burst to ignite the HID lamp.

10. The method of claim 1, wherein the pre-ignition bursts momentarily ignite the ceramic HID lamp and cause significant current to momentarily flow, wherein during said pre-ignition bursts an arc is formed substantially only between the proximal ends of said two electrodes.

11. The method of claim 1, wherein the pre-ignition voltage bursts are configured to have sufficiently short duration to avoid arcing in the bores of the capillaries surrounding said two electrodes.

12. A high frequency ballast for adaptive ignition control of a ceramic high intensity discharge (HID) lamp including an arc chamber and two capillaries each connected to the arc chamber at respective proximal ends of the capillaries, two electrodes each sealed within the capillaries by respective seals near the distal ends of the capillaries, wherein the two electrodes extend from the seals through respective bores in the capillaries and protrude into the arc chamber at the proximal ends of the capillaries, the high frequency ballast comprising:
an ignition circuit connected to output terminals, wherein the two electrodes are adapted to connect to said output terminals;
a sensor adapted to sense a lamp parameter on said output terminals;
a microprocessor operatively attached said ignition circuit and said sensor;
wherein the ignition circuit is configured by said microprocessor to apply a train of pre-ignition voltage bursts to the two electrodes during a time interval between the pre-ignition voltage bursts while the duration of the pre-ignition voltage bursts are increased and stop the train of pre-ignition bursts responsive to the lamp parameter sensed, and wherein the sensed lamp parameter is indicative of a stable arc at the proximal ends of the capillaries.

13. The high frequency ballast of claim 12, wherein the lamp parameter is measured during a time interval between the pre-ignition voltage bursts.

14. The high frequency ballast of claim 12, wherein the lamp parameter is selected from the group consisting: a voltage across said output terminals, a current through said output terminals, a frequency at said output terminals, a phase difference at said output terminals, a power at said output terminals, an impedance at said output terminals and a temperature at said output terminals.

15. The high frequency ballast of claim 12, wherein a time duration of the pre-ignition bursts is adaptively increased responsive to said measured parameter.

16. The high frequency ballast of claim 12, wherein a burst rate of the pre-ignition bursts is adaptively increased responsive to said measured parameter.

17. The high frequency ballast of claim 12, wherein the ignition circuit is configured by said microprocessor during the pre-ignition bursts to momentarily ignite the ceramic HID lamp and cause thereby significant current to momentarily flow, wherein during said pre-ignition bursts an arc is produced substantially only between the proximal ends of said two electrodes.

18. The high frequency ballast of claim 12, wherein the ignition circuit is configured by said microprocessor to apply a final ignition burst and to operate the lamp, only after said two electrodes are sufficiently heated by said pre-ignition bursts to avoid arcing in the bores of the capillaries during the final ignition burst.

19. The high frequency ballast of claim 12, wherein the pre-ignition voltage bursts have a peak voltage of 2000-4000 volts.

20. The high frequency ballast of claim 12, wherein the pre-ignition voltage bursts have a frequency of 100-500 kilohertz.

* * * * *